(12) United States Patent
Sirpal

(10) Patent No.: US 10,318,106 B2
(45) Date of Patent: Jun. 11, 2019

(54) USER INTERFACE WITH STACKED APPLICATION MANAGEMENT

(71) Applicant: Z124, George Town (KY)

(72) Inventor: Sanjiv Sirpal, Oakville (CA)

(73) Assignee: Z124, George Town (KY)

( * ) Notice: Subject to any disclaimer, the term of this patent is extended or adjusted under 35 U.S.C. 154(b) by 955 days.

(21) Appl. No.: 14/733,669

(22) Filed: Jun. 8, 2015

(65) Prior Publication Data

US 2015/0268851 A1 Sep. 24, 2015

Related U.S. Application Data

(63) Continuation of application No. 12/948,699, filed on Nov. 17, 2010, now Pat. No. 9,052,800.

(Continued)

(51) Int. Cl.
*G06F 3/00* (2006.01)
*G06F 3/0481* (2013.01)

(Continued)

(52) U.S. Cl.
CPC ........ *G06F 3/04817* (2013.01); *G06F 1/1616* (2013.01); *G06F 1/1641* (2013.01);

(Continued)

(58) Field of Classification Search
CPC ............... G06F 3/04817; G06F 1/1616; G06F 3/04883; G06F 1/1641; G06F 1/1677; G06F 2200/1637; G06F 3/044; G06F 3/0483; G06F 3/1423; G06F 3/0482; G06F 3/04845; G06F 1/1647; G06F 3/017; G06F 3/0412; G06F 3/0416; G06F 3/0481; G06F 3/04842; G06F 3/04847; G06F 3/0486; G06F 3/0488; G06F 3/04886; G06F 1/16; G06F 1/1632; G06F 1/1694; G06F 2200/1614;

(Continued)

(56) References Cited

U.S. PATENT DOCUMENTS 8,291,344 B2   10/2012   Chaudhri
8,504,936 B2 *  8/2013   Gimpl .................. G06F 1/1616
                                                                715/751

(Continued)

FOREIGN PATENT DOCUMENTS

EP   2109297   10/2009

OTHER PUBLICATIONS

International Search Report and Written Opinion for International (PCT) Application No. PCT/US2011/052619 dated Mar. 23, 2012, 11 pages.

(Continued)

*Primary Examiner* — Di Xiao
(74) *Attorney, Agent, or Firm* — Sheridan Ross P.C.

(57) ABSTRACT

Methods and apparatus for controlling a computing device using gesture inputs. The gesture inputs may be operative to move screens corresponding to applications executing on the handheld computing device from one display to another. Additionally, a multi portion gesture may be used to target different screens. For example, a first portion of the gesture may maintain or "pin" a screen in a display such that a second portion of the gesture is operative to move a different screen behind the pinned application.

20 Claims, 11 Drawing Sheets

Related U.S. Application Data

(60) Provisional application No. 61/389,000, filed on Oct. 1, 2010, provisional application No. 61/389,117, filed on Oct. 1, 2010, provisional application No. 61/389,087, filed on Oct. 1, 2010.

(51) Int. Cl.

| | |
|---|---|
| *G06F 1/16* | (2006.01) |
| *G06F 3/0483* | (2013.01) |
| *G06F 3/0488* | (2013.01) |
| *G06F 3/0484* | (2013.01) |
| *G06F 3/0486* | (2013.01) |
| *G06F 3/01* | (2006.01) |
| *G06F 3/041* | (2006.01) |
| *G06F 3/14* | (2006.01) |
| *G06F 3/0482* | (2013.01) |

(52) U.S. Cl.
CPC ............ *G06F 1/1647* (2013.01); *G06F 3/017* (2013.01); *G06F 3/0412* (2013.01); *G06F 3/0416* (2013.01); *G06F 3/0481* (2013.01); *G06F 3/0482* (2013.01); *G06F 3/0483* (2013.01); *G06F 3/0486* (2013.01); *G06F 3/0488* (2013.01); *G06F 3/04842* (2013.01); *G06F 3/04845* (2013.01); *G06F 3/04847* (2013.01); *G06F 3/04883* (2013.01); *G06F 3/04886* (2013.01); *G06F 3/1423* (2013.01)

(58) Field of Classification Search
CPC ......... G06F 2203/04803; G06F 3/0346; G06F 3/041; G06F 3/048; G06F 3/04812; G06F 3/0484; G06F 3/1446; G06F 1/1643; G06F 1/1649; G06F 2203/04104; G06F 2203/04808; G06F 3/1431; G06F 9/451; G06F 3/0485; G06F 9/44

See application file for complete search history.

(56) References Cited

U.S. PATENT DOCUMENTS

| | | | |
|---|---|---|---|
| 9,052,800 B2 | 6/2015 | Sirpal | |
| 9,104,307 B2 * | 8/2015 | Jarrett | .................. G06F 9/4443 |
| 2002/0158811 A1 * | 10/2002 | Davis | .................. G06F 1/1616 |
| | | | 345/1.1 |
| 2003/0236867 A1 | 12/2003 | Natsuno et al. | |
| 2006/0190838 A1 * | 8/2006 | Nadamoto | .............. G06F 9/451 |
| | | | 715/781 |
| 2006/0227106 A1 | 10/2006 | Hashimoto et al. | |
| 2010/0007603 A1 | 1/2010 | Kirkup | |
| 2011/0209104 A1 * | 8/2011 | Hinckley | .............. G06F 3/0416 |
| | | | 715/863 |

OTHER PUBLICATIONS

International Preliminary Report on Patentability for International (PCT) Application No. PCT/US2011/052619 dated Apr. 11, 2013, 8 pages.
Official Action for U.S. Appl. No. 12/948,699 dated Dec. 20, 2012, 10 pages.
Official Action for U.S. Appl. No. 12/948,699 dated Apr. 3, 2013, 11 pages.
Official Action for U.S. Appl. No. 12/948,699 dated Sep. 26, 2013, 11 pages.
Official Action for U.S. Appl. No. 12/948,699 dated May 6, 2014, 15 pages.
Notice of Allowance for U.S. Appl. No. 12/948,699 dated Jan. 20, 2015, 14 pages.

* cited by examiner

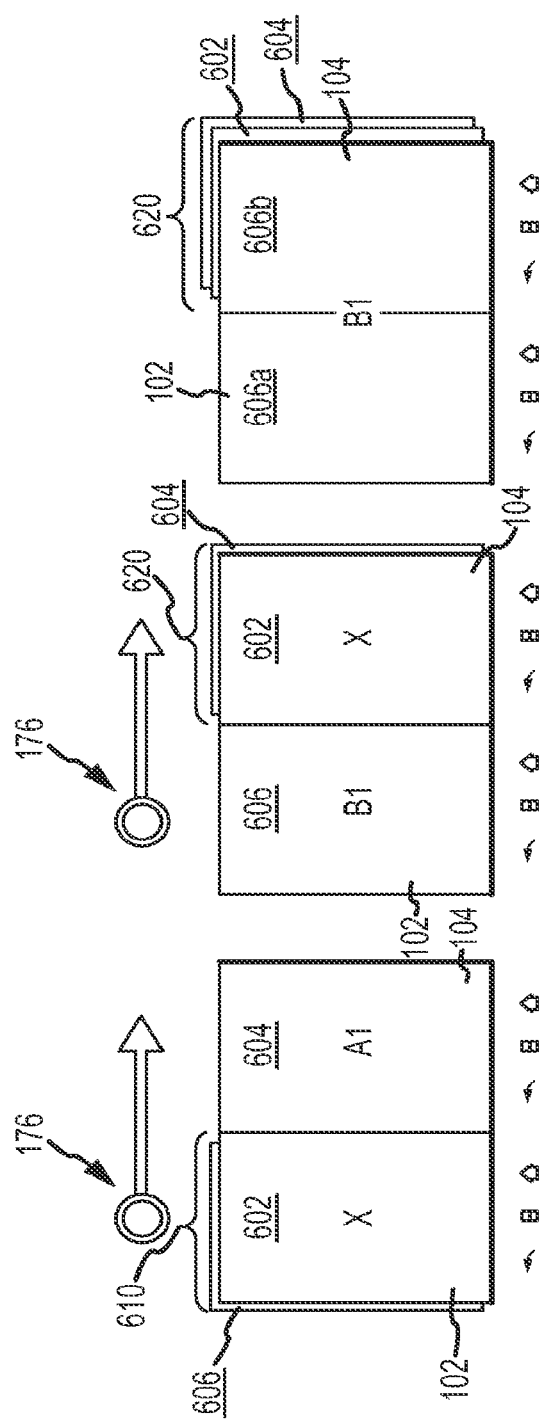

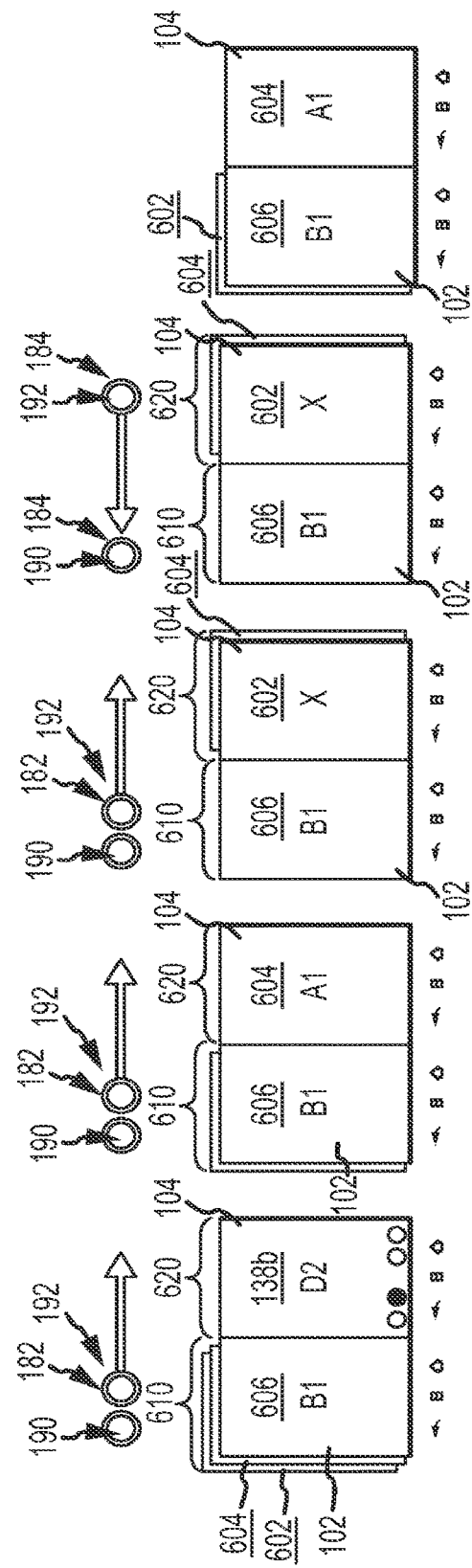

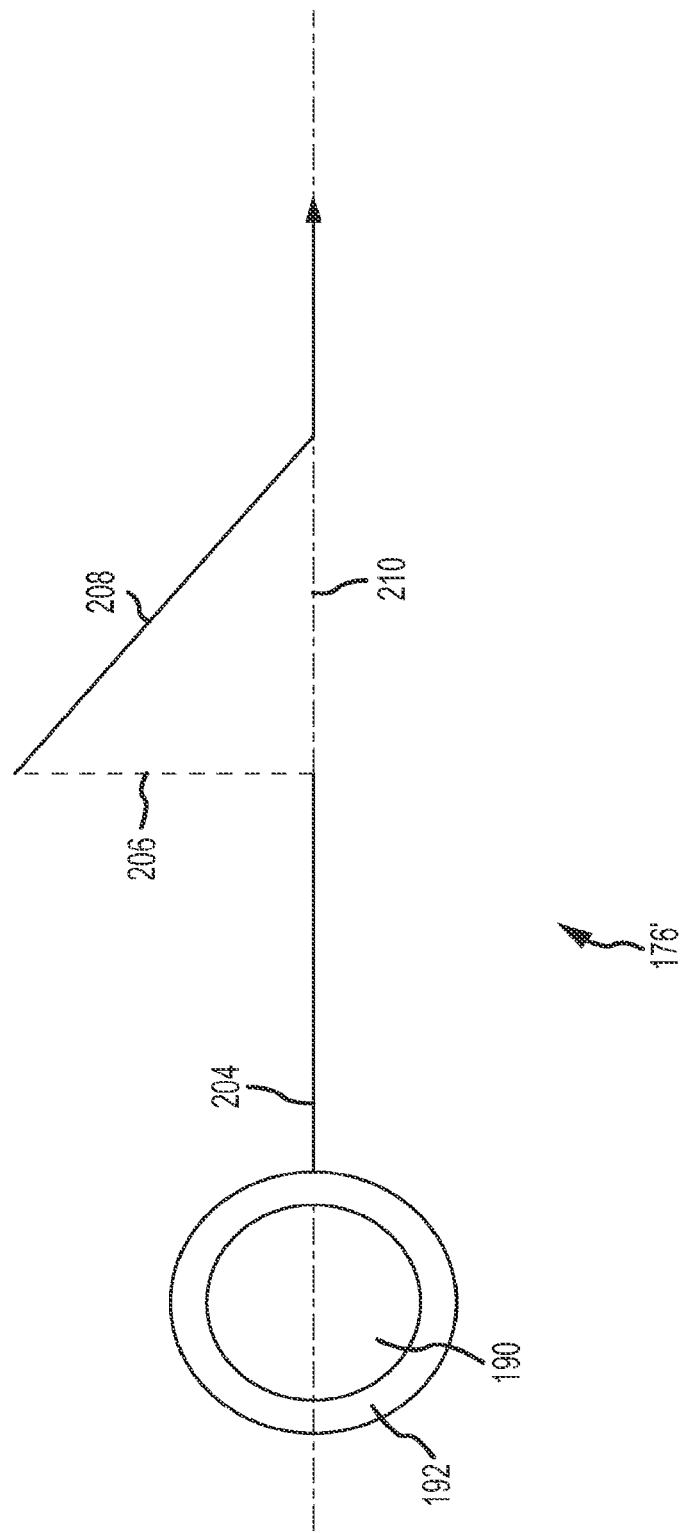

USER INTERFACE WITH STACKED APPLICATION MANAGEMENT

RELATED APPLICATIONS

This application is a continuation of U.S. patent application Ser. No. 12/948,699 filed Nov. 17, 2010, entitled "USER INTERFACE WITH STACKED APPLICATION MANAGEMENT" and claims priority to U.S. Provisional Application Ser. No. 61/389,000, filed Oct. 1, 2010, entitled "DUAL DISPLAY WINDOWING SYSTEM"; Provisional Application Ser. No. 61/389,117, 5 filed Oct. 1, 2010, entitled "MULTI-OPERATING SYSTEM PORTABLE DOCKETING DEVICE"; and Provisional Application Ser. No. 61/389,087, filed Oct. 1, 2010, entitled "TABLET COMPUTING USER INTERFACE". Each and every part of the foregoing provisional applications is hereby incorporated by reference in their entirety.

BACKGROUND

As the computing and communication functions of handheld computing devices become more powerful, the user interface and display elements of such devices have evolved by attempting to adapt user interface regimes developed for personal computers for use with handheld computing devices. However, this attempt to adapt prior user interface regimes has been met with various hurdles.

For instance, the majority of current handheld computing devices make use of a physical keypad for user interface. Many different implementations of physical keypads exist that vary in orientation and relationship to the device screen. However, in every case the physical keypads take up a certain percentage of the physical space of the device and increase the weight of the device. In addition to the disadvantages of size and weight, physical keypads are not configurable in the same manner as a touch screen based user interface. While certain limited forms of physical keypads currently have, on the keys themselves, configurable displays, such as eInk or OLED surfaces, to allow for reconfiguration of the keys, even in these cases, the physical layout of keys is not modifiable. Rather, only the values associated with the physical keys on the keypad may be changed.

Other methods may provide increased user configurability of physical keypads. These methods may include stickers and/or labels that can be added to keys to reference modified functions or plastic overlays on top of the keypad denoting different functional suites. For instance, the ZBoard keyboard, meant for laptop or desktop computer use, incorporates a dual layered physical keyboard which separates the keys and their layout from the connections which send signals to the machine. As such, different physical keyboard inserts for different applications can be inserted into a holder allowing full configurability such that the orientation and layout of the keys in addition to their denotation of function is configurable. This model could be extended to handheld computing devices; however, the rate at which such a modular keypad can change functions is much slower than a touch screen user interface. Furthermore, for each potential functional suite, an additional physical key layout must be carried by the user, greatly increasing the overall physical size and weight of such implementations. One advantage of a physical keypad for handheld computing devices is that the user input space is extended beyond the user display space such that none of the keys themselves, the housing of the keys, a user's fingers, or a pointing device obscure any screen space during user interface activities.

A substantial number of handheld computing devices make use of a small touch screen display to deliver display information to the user and to receive inputs from the user. In this case, while the configurability of the device may be greatly increased and a wide variety of user interface options may be available to the user, this flexibility comes at a price. Namely, such arrangements require shared screen space between the display and the user interface. While this issue is shared with other types of touch screen display/user interface technology, the small form factor of handheld computing devices results in a tension between the displayed graphics and area provided for receiving inputs. For instance, the small display further constrains the display space, which may increase the difficulty of interpreting actions or results while a keypad or other user interface scheme is laid overtop or to the side of the applications in use such that the application is squeezed into an even smaller portion of the display. Thus a single display touch screen solution, which solves the problem of flexibility of the user interface may create an even more substantial set of problems of obfuscation of the display, visual clutter, and an overall conflict of action and attention between the user interface and the display.

Single display touch screen devices thus benefit from user interface flexibility, but are crippled by their limited screen space such that when users are entering information into the device through the display, the ability to interpret information in the display can be severely hampered. This problem is exacerbated in several key situations when complex interaction between display and interface is required, such as when manipulating layers on maps, playing a game, or modifying data received from a scientific application. This conflict between user interface and screen space severely limits the degree to which the touch based user interface may be used in an intuitive manner.

SUMMARY

A first aspect includes a method for controlling a handheld computing device. The method includes logically associating one or more applications with a first display of the handheld computing device. Additionally, the method involves establishing a first application stack corresponding to the one or more applications logically associated with the first display. The method also includes receiving a gesture input at a gesture sensor of the handheld computing device. Furthermore, the method includes moving a first application belonging to the first application stack to a second application stack associated with a second display in response to the receiving step such that the first application is logically associated with the second display.

A second aspect includes a method of controlling a handheld computing device. The method includes receiving a first portion of a gesture input and targeting the first portion of the gesture input to a first display having a first actively displayed screen corresponding to a first application. In turn, the method includes maintaining the first actively displayed screen in the first display in response to the first portion of the gesture input. Additionally, the method includes receiving a second portion of the gesture input and targeting a different screen than the actively displayed screen in the first display with the second portion. As a result, the different screen undergoes a change in position with respect to the first display and at least a second display in response to the second portion of the gesture input.

A third aspect includes a system for controlling a handheld computing device. The system includes a processor, and a first display and a second display that are in operative communication with the processor. The system further includes a gesture sensor that is in operative communication with the processor and is operative to receive a gesture input. The gesture input is interpretable by the processor to move an application from a first application stack associated with the first display to a second application stack associated with the second display.

A number of feature refinements and additional features are applicable to the foregoing aspects. These feature refinements and additional features may be used individually or in any combination. As such, each of the following features that will be discussed may be, but are not required to be, used with any other feature or combination of features of any of the aspects presented herein.

In one embodiment, the first application may be an actively displayed screen of the first display prior to the moving step. The first application may, in turn, be an actively displayed screen of the second display after the moving step. As such, an underlying screen may be revealed in the first display after the moving step. The underlying screen may be one of a desktop screen and an application screen corresponding to a second application logically associated with the first display such that the second application belongs to the first application stack. The first application may obscure a second screen in the second display that comprises an actively displayed screen of the second display prior to the moving step. In yet another embodiment, the moving may further include that the first application is expanded to be the actively displayed screen of the first display and the actively displayed screen of the second display such that the first application belongs to the first application stack and the second application stack.

In another embodiment, the gesture input may have a first gesture portion and a second gesture portion. The gesture input comprises a pin and drag gesture. As such, the first gesture portion may maintain the actively displayed screen in a corresponding application stack, and the second gesture portion may result in movement of the first application relative to the actively displayed screen of the corresponding application stack. As such, the corresponding application stack may the first application stack, and the second gesture portion may be directed away from the first gesture portion. The first application may be revealed in the second display after the moving step. Additionally or alternatively, the corresponding application stack may the second application stack, and the second gesture portion may be directed toward the first gesture portion. In this regard, the first application may be hidden in the second display after the moving step.

In still another embodiment, the first portion and the second portion of the gesture input may be received at a gesture sensor associated with the first display such that the different screen corresponds to a second application residing behind said first application. The first portion of the gesture input may be received at a gesture sensor associated with the first display and the second portion of the gesture input may be received at a gesture sensor associated with the second display. The different screen may be moved from the second display to the first display behind the first screen. The screens targeted in the corresponding may at least partially depend upon a location where the corresponding portion of the gesture input is received.

BRIEF DESCRIPTION OF THE DRAWINGS

FIGS. 6A-6C are graphical representations of an embodiment of a handheld computing device functioning in response to a gesture input.

FIGS. 8A-8E are graphical representations of another embodiment of a handheld computing device functioning in response to a gesture input.

FIG. 10 is a graphical representation of an embodiment of a gesture input.

DETAILED DESCRIPTION

The present disclosure is generally related to gesture inputs for interaction with a computing device. The interface controls are particularly suited for control of devices that have one or more displays capable of displaying graphical user interfaces (GUIs) on a handheld portable device. The following disclosure may, in various embodiments, be applied to other computing devices capable of displaying and responding to a GUI (e.g., laptop computers, tablet computers, desktop computers, touch screen monitors, etc.) and is not intended to be limited to handheld computing devices unless otherwise explicitly specified.

Figure 1:
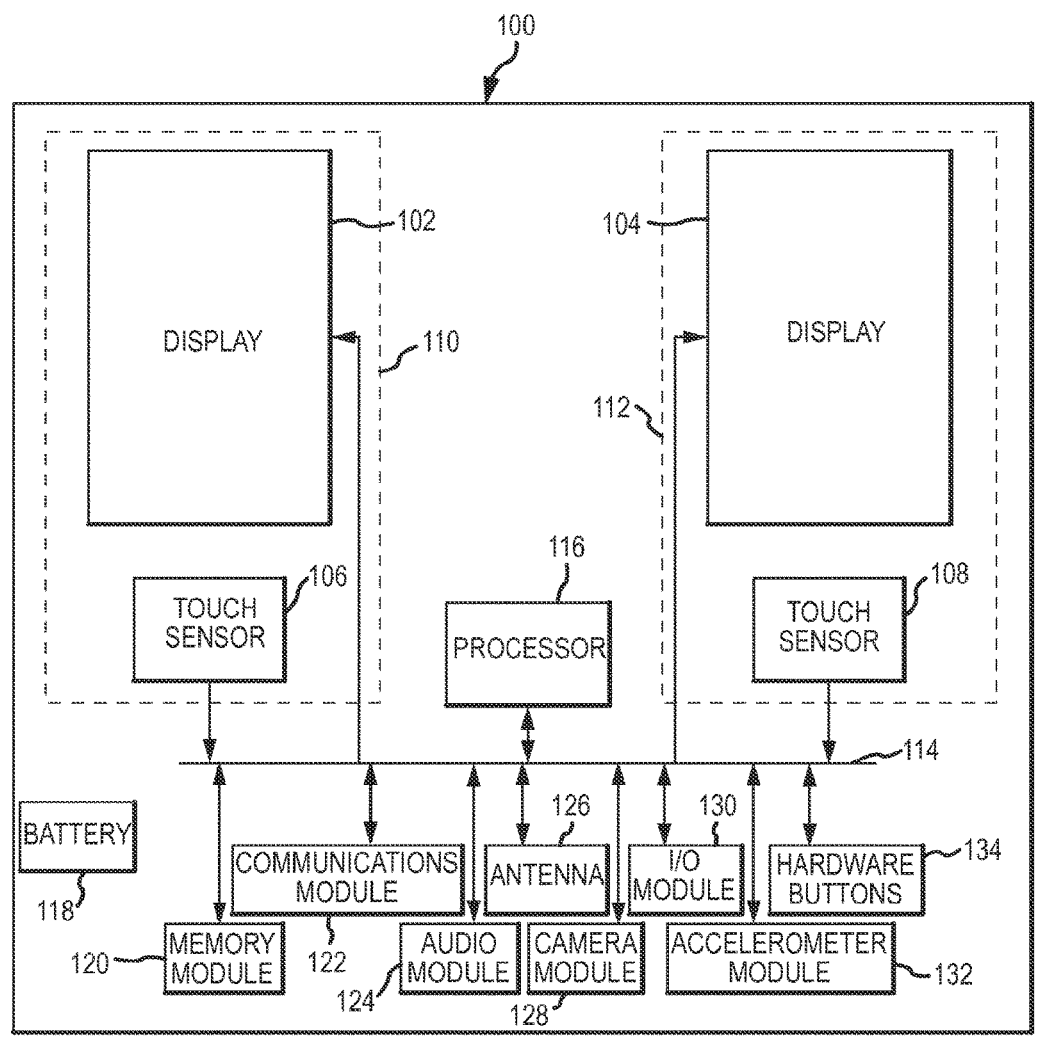
FIG. 1 is a schematic view of an embodiment of a handheld computing device.

FIG. 1 depicts an embodiment of a handheld computing device 100. The handheld computing device 100 may include a first display 102 and a second display 104. Additionally, while two displays (102, 104) may be shown and described below with regard to the functionality of various embodiments of handheld computing devices, a handheld computing device may be provided that includes one or more displays. In any regard, the first display 102 and the second display 104 may be independently controllable. The displays may be operative to display a rendered image or screen. As used herein, the term "display" is intended to connote device hardware, whereas "screen" is intended to connote the displayed image rendered on the display. In this regard, a display is a physical hardware that is operable to render a screen. A screen may encompass a majority of the display. For instance, a screen may occupy substantially all of the display area except for areas dedicated to other functions (e.g., menu bars, status bars, etc.) Alternatively or additionally, a screen may occupy more than one display. A screen may be associated with an application and/or an operating system executing on the handheld computing device 100. For instance, application screens or desktop screens may be displayed. An application may have various kinds of screens that are capable of being manipulated as will be described further below. In an embodiment, each display may have a resolution of 480 pixels by 800 pixels, although higher and lower resolution displays may also be provided.

A screen may be associated with an operating system, an application, or the like. In some instances, a screen may include interactive features (e.g., buttons, text fields, toggle fields, etc.) capable of manipulation by way of a user input. The user input may be received by various input devices (e.g., a physical keyboard, a roller ball, directional keys, a touch sensitive device, etc.). In some instances, a screen may simply include graphics and have no ability to receive an input by a user. In other instances, graphics features and input features may both be provided by a screen. As such, the one or more displays, the screens displayed on the one or more displays, and various user input devices may comprise a GUI that allows a user to exploit functionality of the handheld computing device.

The handheld computing device 100 may be configurable between a first position and a second position. In the first position, a single display (e.g., the first display 102 or the second display 104) may be visible from the perspective of a user. Both displays 102 and 104 may be exposed on an exterior of the handheld device 100 when in the first position, but the displays 102 and 104 may be arranged in a non-adjacent manner such that both displays 102, 104 are not concurrently visible from the perspective of a user (e.g., one display may be visible from the front of the device 100 and the other display may be visible from the back of the device 100).

The handheld computing device 100 may also be provided in the second position such that the displays 102, 104 may be concurrently viewable from the perspective of a user (e.g., the displays 102, 104 may be positioned adjacent to one another). The displays 102, 104 may be displayed in the second position such that the displays 102, 104 are arranged end-to-end or side-by-side. Additionally, the displays 102, 104 may be arranged in a portrait orientation or a landscape orientation with respect to a user. As will be discussed further below, a portrait orientation is intended to describe an arrangement of the handheld computing device, wherein the longer dimension of the display of the handheld computing device is vertically oriented (e.g., with respect to gravity or the perspective of a user). A landscape orientation is intended to describe an arrangement wherein the shorter dimension of the display of the handheld computing device is vertically oriented (e.g., with respect to gravity or the perspective of a user). Furthermore, the longer dimension and shorter dimension may refer to each display individually or the combined viewing area of the one or more displays of the device. Thus, when the individual displays are arranged in a portrait orientation, the overall display area may be arranged in a landscape orientation, and vice versa. Additionally, the displays and screens may be in different respective orientations. For instance, when the displays are in a landscape orientation, one or more screens may be rendered in a portrait orientation on the displays or vice versa.

The handheld computing device 100 may be manipulated between the first position (e.g., a single display visible from a user's perspective) and the second position (e.g., at least two displays concurrently visible from the user's perspective) in a variety of manners. For instance, the device 100 may include a slider mechanism such that the first and second displays 102, 104 are disposable adjacent to one another in a parallel fashion in a second position and slideable to the first position where only a single display is viewable and the other display is obscured by the viewable display.

Alternatively, the device 100 may be arranged in a clam shell type arrangement wherein a hinge is provided between the first display 102 and the second display 104 such that the displays 102, 104 are concurrently visible by a user when in the second position (i.e., an open position). The displays 102, 104 may be provided on an interior clam shell portion or an exterior clam shell portion of the device 100. In this regard, both displays 102, 104 may be visible from the front and the back of the device, respectively, when the device is in the first position (i.e., the closed position). When the device 100 is in the open position, the displays 102, 104 may be provided adjacent and parallel to one another. Alternative arrangements of the handheld computing device 100 are contemplated wherein different arrangements and/or relative locations of the displays may be provided when in the first and second position.

In addition, the first display 102 and the second display 104 may be provided as entirely separate devices. In this regard, a user may manipulate the displays 102, 104 such that they may be positioned adjacent to one another (e.g., side-by-side or end-to-end). The displays 102, 104 may be in operative communication when adjacently positioned such that the displays 102, 104 may operate in the manner provided in greater detail below when adjacently positioned (e.g., via physical contacts, wireless communications, etc.). A retention member (not shown) may be provided to retain the separate displays 102, 104 in an adjacent position. For instance, the retention member may include coordinating magnets, mechanical clips or fasteners, elastic members, etc.

While the foregoing has referenced two displays 102 and 104, alternate embodiments of a handheld device may include more than two displays. In this regard, the two or more displays may behave in a manner in accordance with the foregoing wherein only a single display is viewable by a user in a first position and multiple displays (i.e., more than two displays) are viewable in a second position. Additionally, in one embodiment, the two displays 102 and 104 may comprise separate portions of a unitary display (not shown). As such, the first display 102 may be a first portion of the unitary display and the second display 104 may be a second portion of the unitary display. For instance, the handheld computing device 100 (e.g., having a first and second display 102 and 104) may be operatively connected to the unitary display (e.g., via a connector or a dock portion of the unitary display) such that the first display 102 and the second display 104 of the handheld computing device 100 are emulated on the unitary display. As such, the unitary display may have first and second portions corresponding to and acting in a similar manner to the first and second display 102 and 104 of the handheld computing device 100 described below.

The handheld computing device 100 may further include one or more input devices that may be used to receive user inputs. These input devices may be operative to receive gesture inputs from a user, and, accordingly, may be referred to generally as gesture sensors. A number of different types of gesture sensors may be provided. Some examples include, but are not limited to traditional input devices (keypads, trackballs, etc.), touch sensitive devices, optical sensors (e.g., a camera or the like), etc. The discussion contained herein may reference the use of touch sensitive devices to receive gesture inputs. However, the use of touch sensitive devices is not intended to limit the means for receiving gesture inputs to touch sensitive devices alone and is provided for illustrative purposes only. Accordingly, any of the foregoing means for receiving a gesture input may be used to produce the functionality disclosed below with regard to gesture inputs received at touch sensitive devices.

In this regard, the handheld computing device 100 may include at least a first touch sensor 106. Furthermore, the handheld computing device may include a second touch sensor 108. The first touch sensor 106 and/or the second touch sensor 108 may be touchpad devices, touch screen devices, or other appropriate touch sensitive devices. Examples include capacitive touch sensitive panels, resistive touch sensitive panels, or devices employing other touch sensitive technologies. The first touch sensor 106 and/or second touch sensor 108 may be used in conjunction with a portion of a user's body (e.g., finger, thumb, hand, etc.), a stylus, or other acceptable touch sensitive interface mechanisms known in the art. Furthermore, the first touch sensor 106 and/or the second touch sensor 108 may be multi-touch devices capable of sensing multiple touches simultaneously.

The first touch sensor 106 may correspond to the first display 102 and the second touch sensor 108 may correspond to the second display 104. In one embodiment of the handheld computing device 100, the first display 102 and the first touch sensor 106 comprise a first touch screen display 110. In this regard, the first touch sensor 106 may be transparent or translucent and positioned with respect to the first display 102 such that a corresponding touch received at the first touch sensor 106 may be correlated to the first display 102 (e.g., to interact with a screen rendered on the first display 102). Similarly, the second display 104 and the second touch sensor 108 may comprise a second touch screen display 112. In this regard, the second touch sensor 108 may be positioned with respect to the second display 104 such that a touch received at the second touch sensor 108 may be correlated to the second display 104 (e.g., to interact with a screen rendered on the second display 104). Alternatively, the first touch sensor 106 and/or the second touch sensor 108 may be provided separately from the displays 102, 104. Furthermore, in an alternate embodiment, only a single gesture sensor may be provided that allows for inputs to control both the first display 102 and the second display 104. The single gesture sensor may also be provided separately or integrally with the displays.

In this regard, the first and second touch sensors 106, 108 may have the substantially same footprint on the handheld computing device 100 as the displays 102, 104. Alternatively, the touch sensors 106, 108 may have a footprint including less of the entirety of the displays 102, 104. Further still, the touch sensors 106, 108 may include a footprint that extends beyond the displays 102, 104 such that at least a portion of the touch sensors 106, 108 are provided in non-overlapping relation with respect to the displays 102, 104. As discussed further below, the touch sensors 106, 108 may alternatively be provided in complete non-overlapping relation such that the footprint of the touch sensors 106, 108 is completely different than the footprint of the displays 102, 104.

With reference to FIGS. 10A and 10B, various potential arrangements are depicted for the first display 102, the second display 104, and touch sensors 106', 106", and 108". In FIG. 10A, the first 102 and second display 104 are arranged side-by-side such that a crease 196 separates the displays. In this regard, the first display 102 and second display 104 may be arranged in a clam-shell type arrangement such that the crease 196 includes a hinge that allows for pivotal movement between the first display 102 and second display 104 as discussed above. A touch sensor 106' may span the width of both the first display 102 and the second display 104. In this regard, the touch sensor 106' may span the crease 196 without interruption. Alternatively, as shown in FIG. 10B, separate touch sensors 106" and 108" may be provided on either side of the crease 196. In this regard, each of the touch sensors 106" and 108" may span the width of each of the first display 102 and second display 104, respectively.

In any of the arrangements shown in FIGS. 10A and 10B, the displays (102, 104) may also comprise touch screen displays that may be used in conjunction with touch sensitive portions that are provided separately from the touch screen displays. Thus, displays 102 and 104 may both comprise touch screen displays and be provided in addition to touch sensitive devices 106', 106", and 108". Accordingly, a combination of touch screen displays (e.g., 110, 112) and off display touch sensors (e.g., 106', 106", 108") may be provided for a single device. Touch inputs may be received at both a touch screen display (110, 112) and off display touch sensor (106', 106", 108"). In this regard, gestures received at an off screen display sensor may have a different functionality than the same gesture received at a touch screen display. Also, a touch sensitive device may be divided into a plurality of zones. The same gesture received in different zones may have different functionality. For instance, a percentage (e.g., 10%, 25%, etc.) of the touch sensitive device at the top or bottom of the display may be defined as a separate zone than the remainder of the touch sensitive device. Thus, a gesture received in this zone may have a different functionality than a gesture received in the remainder of the touch sensitive device.

The handheld computing device 100 may further include a processor 116. The processor 116 may be in operative communication with a data bus 114. The processor 116 may generally be operative to control the functionality of the handheld device 100. For instance, the processor 116 may execute an operating system and be operative to execute applications. The processor 116 may be in communication with one or more additional components 120-134 of the handheld computing device 100 as will be described below. For instance, the processor 116 may be in direct communication with one more of the additional components 120-134 or may communicate with the one or more additional components 120-134 via the data bus 114. Furthermore, while the discussion below may describe the additional components 120-134 being in operative communication with the data bus 114, in other embodiments any of the additional components 120-134 may be in direct operative communication with any of the other additional components 120-134. Furthermore, the processor 116 may be operative to independently control the first display 102 and the second display 104 and may be operative to receive input from the first touch sensor 106 and the second touch sensor 108. The processor 116 may comprise one or more different processors. For example, the processor 116 may comprise one or more application specific integrated circuits (ASICs), one or more field-programmable gate arrays (FPGAs), one or more general purpose processors operative to execute machine readable code, or a combination of the foregoing.

The handheld computing device may include a battery 118 operative to provide power to the various devices and components of the handheld computing device 100. In this regard, the handheld computing device 100 may be portable.

The handheld computing device 100 may further include a memory module 120 in operative communication with the data bus 114. The memory module 120 may be operative to store data (e.g., application data). For instance, the memory 120 may store machine readable code executable by the processor 116 to execute various functionalities of the device 100.

Additionally, a communications module 122 may be in operative communication with one or more components via the data bus 114. The communications module 122 may be operative to communicate over a cellular network, a Wi-Fi connection, a hardwired connection or other appropriate means of wired or wireless communication. The handheld computing device 100 may also include an antenna 126. The antenna 126 may be in operative communication with the communications module 122 to provide wireless capability to the communications module 122. Accordingly, the handheld computing device 100 may have telephony capability (i.e., the handheld computing device 100 may be a smartphone device).

An audio module 124 may also be provided in operative communication with the data bus 114. The audio module 124 may include a microphone and/or speakers. In this regard, the audio module 124 may be able to capture audio or produce sounds. Furthermore, the device 100 may include a camera module 128. The camera module 128 may be in operative communication with other components of the handheld computing device 100 to facilitate the capture and storage of images or video.

Additionally, the handheld computing device 100 may include an I/O module 130. The I/O module 130 may provide input and output features for the handheld computing device 100 such that the handheld computing device 100 may be connected via a connector or other device in order to provide syncing or other communications between the handheld computing device 100 and another device (e.g., a peripheral device, another computing device etc.).

The handheld computing device 100 may further include an accelerometer module 132. The accelerometer module 132 may be able to monitor the orientation of the handheld computing device 100 with respect to gravity. In this regard, the accelerometer module 132 may be operable to determine whether the handheld computing device 100 is substantially in a portrait orientation or landscape orientation. The accelerometer module 132 may further provide other control functionality by monitoring the orientation and/or movement of the handheld computing device 100.

The handheld computing device 100 may also include one or more hardware buttons 134. The hardware buttons 134 may be used to control various features of the handheld computing device 100. The hardware buttons 134 may have fixed functionality or may be contextual such that the specific function of the buttons changes during operation of the handheld computing device 100. Examples of such hardware buttons may include, but are not limited to, a volume control, a home screen button, an end button, a send button, a menu button, etc.

With further reference to FIGS. 2A-D, various screens of an embodiment of a device are shown. multiple screens may be shown, only one or a subset of the multiple screens may be shown on the displays of the device at any one moment. In this regard, a screen may be described in a relative location to the displays or other screens (e.g., to the left of a display, to the right of a display, under another screen, above another screen, etc.). These relationships may be logically established such that no physical display reflects the relative position. For instance, a screen may be moved off a display to the left. While the screen is no longer displayed on the display, the screen may have a virtual or logical position to the left of the display from which it was moved. This logical position may be recognized by a user and embodied in values describing the screen (e.g., values stored in memory correspond to the screen). Thus, when referencing screens in relative locations to other screens, the relationships may be embodied in logic and not physically reflected in the display of the device.

FIGS. 2A-D may display a number of different screens that may be displayed at various instances of operation of a handheld device and are not intended to be presented in any particular order or arrangement. Single screen applications and multi screen applications may be provided. A single screen application is intended to describe an application that is capable of producing a screen that may occupy only a single display at a time. A multi screen application is intended to describe an application that is capable of producing one or more screens that may simultaneously occupy multiple displays. Additionally, a multi screen application may occupy a single display. In this regard, a multi screen application may have a single screen mode and a multi screen mode.

Figure 2A:
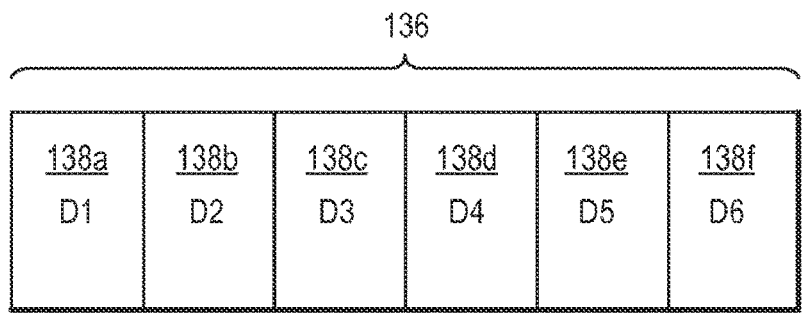
FIGS. 2A-D are graphical representations of an embodiment of a handheld computing device in various instances of operation.

A desktop sequence 136 is displayed in FIG. 2A. The desktop sequence 136 may include a number of individual desktop screens 138a-138f. Thus, each desktop screen 138 may occupy substantially the entirety of a single display (e.g., the first display 102 or second display 104 of FIG. 1). The desktop screens 138a-138f may be in a predetermined order such that the desktop screens 138a-138f appear consecutively and the order in which the desktop screens appear may not be reordered. However, the desktop screens 138a-138f may be sequentially navigated (e.g., in response to a user input). That is, one or more of the desktop screens 138a-138f may be sequentially displayed on a handheld device as controlled by a user input.

Figure 2B:
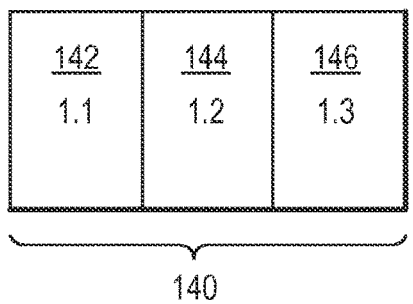
Figure 2C:
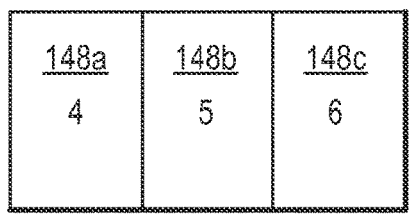

Additionally, FIG. 2B displays a hierarchal application sequence 140 of a multi screen application. The hierarchal application sequence 140 may include a root screen 142, one or more node screens 144, and a leaf screen 146. The root screen 142 may be a top level view of the hierarchical application sequence 140 such that there is no parent screen corresponding to the root screen 142. The root screen 142 may be a parent to a node screen 144. One or more node screens 144 may be provided that are related as parent/children. A node screen may also serve as a parent to a leaf screen 146. By leaf screen 146, it is meant that the leaf screen 146 has no corresponding node screen 144 for which the leaf screen 146 is a parent. As such, the leaf screen does not have any children node screens 144. FIG. 2C depicts various single screen applications 148a, 148b, and 148c arranged sequentially. Each of these single screen applications may correspond to a different executing application. For instance, in FIG. 2C Application 4, Application 5, and Application 6 may be executing on the device and correspond to each single screen 148a, 148b, and 148c, respectively.

Figure 2D:
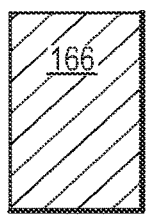

FIG. 2D also includes an empty view 166. The empty view 166 may be used during transitions of a screen (e.g., movement of screen between a first display and a second display). It is not necessary that the empty view 166 be interpretable by the user as an effective GUI screen. The empty view 166 merely communicates to the user that an action regarding the screen (e.g., the movement of the screen with respect to one or more displays) is occurring. An application displaying an empty view 166 need not be able to rest, wait, process or interpret input. The empty view 166 may display a screen, or a representation thereof, as it is being moved in proportion to the amount of the screen that has been moved from a first display to a second display as will be discussed in greater detail below. In this regard, the empty view 166 may be used to relate information regarding the position of a screen during a transition of the screen (e.g., in response to gesture). An empty view 166 is only intended to refer to a screen not capable of receiving an input (e.g., a screen in transition). In this regard, the display of an empty view 166 may include an animation or the like showing the response of a screen as it is being moved or changed (e.g., modified into or out of a landscape mode).

Figure 3A:
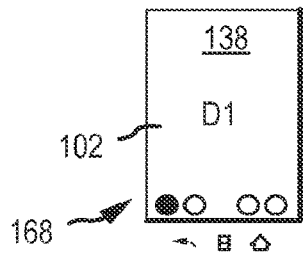
FIGS. 3A-K are graphical representations of an embodiment of a handheld computing device provided in different positions, orientations, and instances of operation.
Figure 3B:
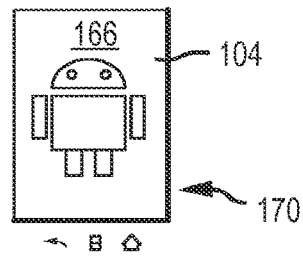
Figure 3C:
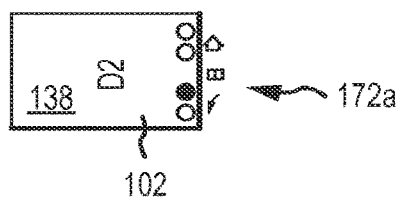
Figure 3D:
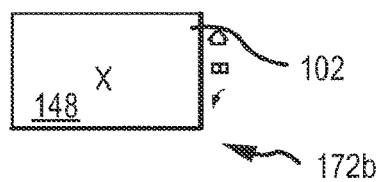
Figure 3E:
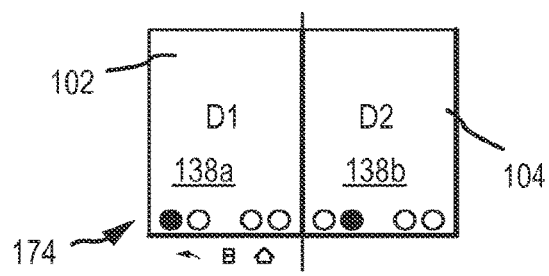
Figure 3F:
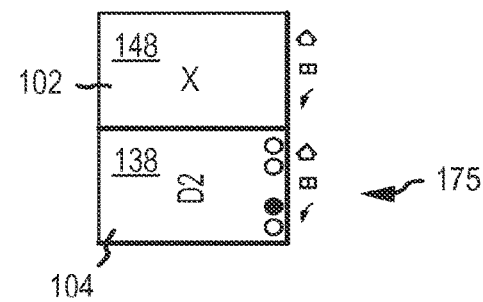
Figure 3G:
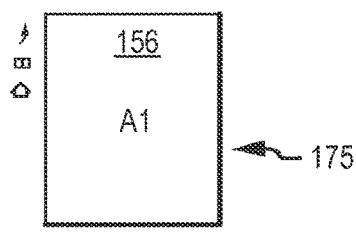
Figure 3H:
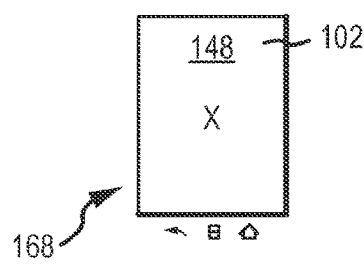

FIGS. 3A-K depict various arrangements and statuses of displays 102, 104 of a device that are possible in various embodiments of a handheld computing device according to the present disclosure. For instance, when in the first (e.g., closed) position, a closed front display 168 may be visible as shown in FIG. 3A. The closed front display 168 may correspond with the first display 102 or the second display 104. The closed front 168 as displayed may be occupied by a desktop screen D1 138 as shown in FIG. 3A. Alternatively, an application with a single screen or a multi screen application in single screen mode may be displayed in the closed front 168. A closed back display 170 may be viewable from an opposite side of the display when the device is in a closed position, as shown in FIG. 3B. The closed back 170 may display a different desktop screen or application screen than the closed front 168 (e.g., as shown in FIG. 3H) or may simply display an empty view 166 (e.g., displaying an icon or other graphic) and lack functionality as an interface.

FIG. 3C depicts a closed device in a landscape orientation 172a. In one embodiment, a landscape mode (i.e., wherein the display is adjusted to display a screen in a landscape orientation) may not be enabled as shown in FIG. 3C. Alternatively, the landscape mode may be enabled such that the screen (e.g., application screen 148) is modified when the device is sensed in a landscape orientation 172b, such that the screen 148 is rendered in a landscape orientation as shown at FIG. 3D.

The device may further be provided in a second (e.g., open) position 174 as shown in FIG. 3E. In the open position 174, at least two displays 102, 104 are arranged such that the two displays 102, 104 are both visible from the vantage point of a user. The two displays 102, 104 may be arranged in a side-by-side fashion when in the open position 174. Thus, each of the two displays 102, 104 may display separate screens. For instance, the displays 102, 104 may each display a separate desktop screen 138a, 138b, respectively. While the individual displays 102 and 104 are in a portrait orientation as shown in FIG. 3E, it may be appreciated that the full display area (comprising both the first display 102 and the second display 104) may be arranged in a landscape orientation. Thus, whether the device as depicted in FIG. 3E is in a landscape or portrait orientation may depend on whether the displays are being used individually or collectively. If used collectively as a unitary display, the device may be in a landscape orientation, whereas if the displays are used separately, the orientation shown in FIG. 3E may be referred to as a portrait orientation.

Additionally, when the device is in an open position 174 as shown in FIG. 3F, a similar dependency with regard to the use of the screens as a unitary display or separate displays may also affect whether the device is in a portrait orientation or landscape orientation. As can be appreciated, each individual screen is in a landscape orientation, such that if the displays are used separately, the device may be in a landscape orientation. If used as a unitary display, the device may be in a portrait orientation. In any regard, as shown in FIG. 3F, a single screen 148 may occupy a first display 102 and the second display 104 may display a desktop screen 138. The single screen 148 may be displayed in a landscape or portrait mode. Alternatively, a device in an open orientation may display a multi screen application 156 that may occupy both displays 102, 104 in a portrait orientation as shown in FIG. 3G such that the individual displays are in a landscape orientation.

Figure 3I:
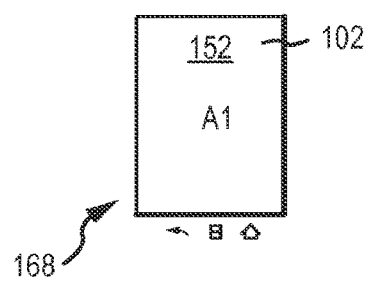
Figure 3J:
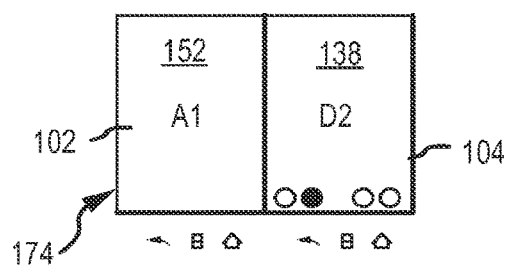
Figure 3K:
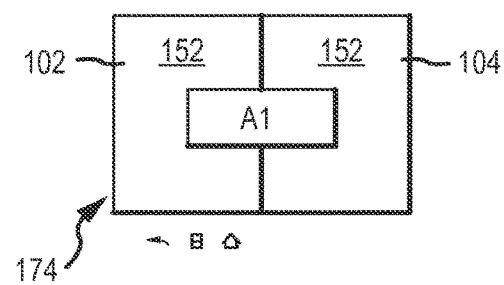

FIGS. 3I-K depict the potential arrangements of the screens of a multi screen application 152. The multi screen application 152 may, in one mode, occupy a single display 102 when the device is in a closed position 168 as shown in FIG. 3I. That is, the multi screen application 152 may be in a single screen mode. Alternatively, when the device is in an open position as shown in FIG. 3J, the multi screen application 152 may still occupy a single display 102 in single screen mode. Furthermore, the multi screen application 152 may be expanded to occupy both displays 102, 104 when the device is in the open position as shown in FIG. 3K. In this regard, the multi screen application 152 may also execute in a multi screen mode. Various options may be provided for expanding the multi screen application 152 from a single screen mode to a multi screen mode.

For example, the multi screen application 152 may be maximized from a single screen mode displayed in a single display to two screens displayed in two displays such that a parent screen is displayed in the first display and a node screen (e.g., a child screen) is expanded into the second display. In this regard, each of the screens displayed in the first and second display may be independent screens that comprise part of a hierarchical application sequence (e.g., as shown in FIG. 2B). Alternatively, the single screen mode of the multi screen application may simply be scaled such that the contents of the single screen are scaled to occupy both displays. Thus, the same content displayed in the single screen is scaled to occupy multiple displays, but no additional viewing area or graphics are presented. Further still, the maximization of the multi screen application from a single screen mode to a multi screen mode may result in the expansion of the viewable area of the application. For example, if a multi screen application is displayed in single screen mode, upon maximization into multi screen mode, the viewable area of the multi-screen application may be expanded while the scale of the graphics displayed remains the same. In this regard, the viewable area of the multi-screen application may be expanded into the second display while the scaling remains constant upon expansion.

In this regard, an application may have configurable functionality regarding the nature and behavior of the screens of the application. For instance, an application may be configurable to be a single screen application or a multi screen application. Furthermore, a multi screen application may be configurable as to the nature of the expansion of the multi screen application between a single screen mode and a multi screen mode. These configuration values may be default values that may be changed or may be permanent values for various applications. These configuration values may be communicated to the device (e.g., the processor 116) to dictate the behavior of the application when executing on the device.

Figure 4:
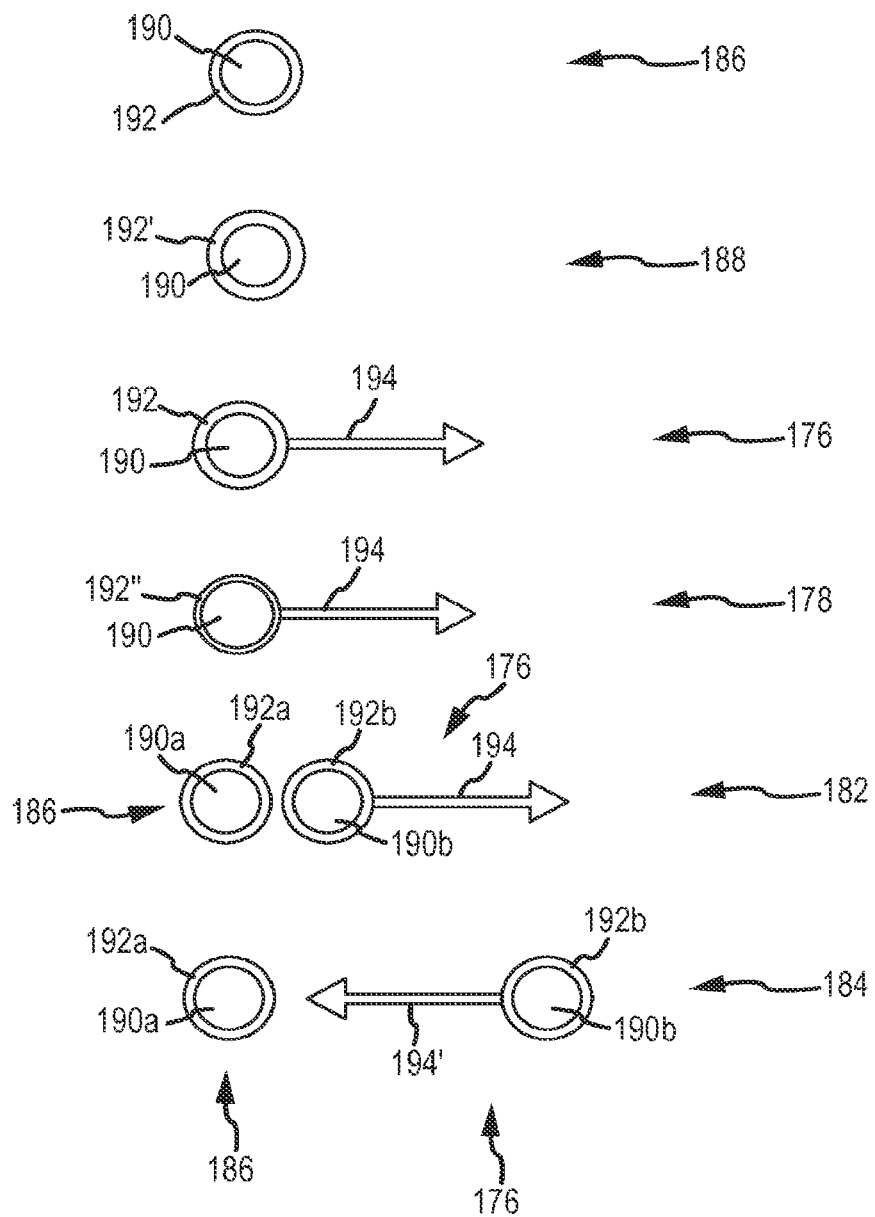
FIG. 4 includes graphical representations of various gesture inputs for controlling a handheld computing device.

FIG. 4 depicts various graphical representations of gesture inputs that may be recognized by a handheld computing device. The gestures shown are demonstrative, and as such, other gestures may be provided without limitation. Such gestures may be received at one or more gesture sensors of the device or other gesture sensor as described above. In this regard, various input mechanisms may be used in order to generate the gestures shown in FIG. 4. For example a stylus, a user's finger(s), or other devices may be used to activate a gesture sensor in order to receive the gestures. Alternatively, the gestures may be detected by an optical device (e.g., a camera). The use of a gesture may describe the use of a truncated input that results in functionality without the full range of motion necessary to conventionally carry out the same functionality. For instance, movement of screens between displays may be carried out by selecting and moving the screen between displays such that the full extent of the motion between displays is received as an input. However, such an implementation may be difficult to accomplish in that the first and second displays may comprise separate display portions without continuity therebetween. As such, a gesture may truncate the full motion of movement or provide an alternative input to accomplish the same functionality. Thus, movement spanning the first and second display may be truncated so that the gesture may be received at a single gesture sensor. The use of gesture inputs is particularly suited to handheld computing devices in that the full action of an input may be difficult to execute given the limited input and display space commonly provided on a handheld computing device.

With reference to FIG. 4, a circle 190 may represent an input received at a gesture sensor. The circle 190 may include a border 192, the thickness of which may indicate the length of time the input is held stationary. In this regard, a tap 186 has a thinner border 192 than the border 192' for a long press 188. In this regard, the long press 188 may involve an input that remains stationary for longer than that of a tap 186. As such, different gestures may be registered depending upon the length of time that the gesture remains stationary prior to movement.

A drag 176 involves an input (represented by circle 190) with movement 194 in a direction. The drag 176 may involve an initiating gesture (e.g., a tap 186 or long press 188) that remains stationary with respect to the gesture sensor for a certain amount of time represented by the border 192. In contrast, a flick 178 may involve an input with a shorter dwell time prior to movement than the drag 176 as indicated by the thinner border 192" of the initiation of the flick 178. The flick 178 may also include movement 194. The direction of movement 194 of the drag and flick 178 may be referred to as the direction of the drag 176 or direction of the flick 178.

In an embodiment, a gesture having movement (e.g., a flick 178 or drag gesture 176 as described above) may be limited to movement in a single direction along a single axis (e.g., a horizontal, vertical, or other axis). Thus, movement in a direction different than along the first axis may be disregarded during the execution of the gesture. In this regard, once a gesture is initiated, movement in a direction not along an axis along which initial movement is registered may be disregarded or only the vector component of movement along the axis may be registered.

While the gestures shown in FIG. 4 include only horizontal motion after the initial input, this may not be actual movement by the user when entering the gesture. For instance, once a drag 176 is initiated in the horizontal direction, movement in a direction other than in the horizontal direction may not result in movement of the screen to be moved in the direction different than the horizontal direction. For instance, with further reference to FIG. 11, the drag 176 from left to right may be initiated with initial movement 204 from left to right along an initiated direction 210. Subsequently, the user may input an off direction movement 206 in a direction different than the initiated direction 210. In this regard, the off direction movement 206 may not result in any movement of a screen between two displays. Furthermore, the user may input partially off direction movement 208, where only a vector portion of the movement is in the direction of the initiated direction 210. In this regard, only the portion of the partially off direction movement 208 may result in movement of a screen between displays. In short, the movement of application screens between the first display 102 and the second display 104 may be constrained along a single axis along which the displays are arranged.

As briefly discussed above, multiple simultaneous gesture portions may be received at the same time (e.g., by a multi-touch device, or other gesture sensor). A gesture input that combines multiple individual gesture portions may be considered a unique gesture input and have unique functionality associated therewith. For example, a first pin and drag gesture 182 may comprise a first portion including a tap 186 as well as a second portion including a drag gesture 176. The drag gesture 176 may be generally away from the tap 186 such that the direction of the drag gesture 176 is away from the tap gesture 186. Alternatively, a second pin and drag gesture 184 is also shown where the tap 186 may be received and a drag gesture 176 may originate away from the tap 186 and be in a direction towards the tap 186. The first and second portions of a multi portion gesture may have different targets such that the two portions affect different results with respect to an interface as will be discussed in greater detail below.

Figure 5:
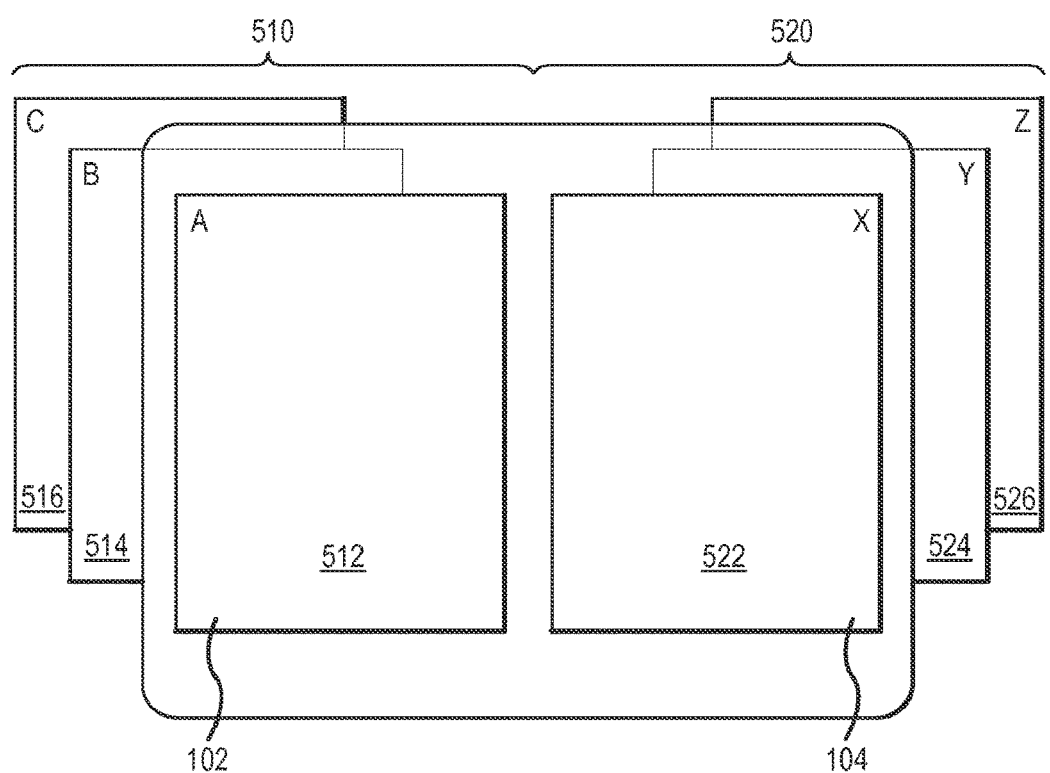
FIG. 5 is a graphical representation of the relative positions of screens executing on displays of an embodiment of a handheld computing device.

Screens may be logically associated with a display and be logically arranged with respect to one another even though not all screens are physically rendered on a display. With additional reference to FIG. 5, this concept is further graphically represented. In FIG. 5, a first display 102 actively displays a first application screen (screen A 512). Additionally, a first application stack 510 is depicted. An application stack may be operative to maintain logical associations of a screen with a respective display. As referenced below, this logical association may be referred to as the position of the application with respect to a display. In this regard, when referring to an application "positioned in a display," it is meant the application is logically associated with the display as the application may not be actively displayed.

In addition, an application stack may logically maintain the relative positions of screens with respect to one another (i.e., the order of the screens in the application stack). In this regard, a screen may be logically disposed in an application stack associated with a display even though the screen may not be physically rendered on the display. A display controller or other control device (e.g., a processor, memory, or an operative combination thereof) may be operative to maintain the logical associations of screens. This may involve storing the logical association of the screen with a display and/or other screens in memory. As such, the logical associations of the screen with a display and with other screens may be logically maintained and/or changed even though the screen is not actively displayed.

For example, the first application stack 510 is comprised of screen A 512, screen B 514, and screen C 516 which are all logically associated with the first display 102. As shown, only screen A 512 from the application stack 510 is physically displayed. Screen B 514 and screen C 516 may belong to the first application stack 510 associated with the first display 102 and be logically positioned behind screen A 510 in the manner shown in FIG. 5. As such, screen B 514 and screen C 516 may be logically positioned behind screen A 512 such that screen B 514 and screen C 516 are not actively rendered on the first display 102. While each application belonging to the first application stack 510 is logically associated with the first display, applications that are not currently rendered in the display may suspend or close when not actively displayed. Alternatively, applications may continue to execute in the background, even though not displayed. Regardless, the non-displayed applications may continue to reside in the application stack 510 until otherwise closed or ended by a user.

A second application stack 520 may also be provided to maintain the logical associations of screens with respect to a second display 104. The second application stack 520 is comprised of screen X 522, screen Y 524, and screen Z 526 and may behave in a manner similar to the first application stack 510 described above. Each of screen A 512, screen B 514, screen C 516, screen X 522, screen Y 524, and screen Z 526 may correspond to individual applications. As shown, screen X 522 is currently displayed. While screen Y 524 and screen Z 526 are logically associated with the second display 104 and are logically positioned behind screen X 522 as shown in FIG. 5. Thus, while each application in the second application stack 520 is disposed in the second display 104, only one application may be actively rendered on the display.

The arrangement (i.e., logical associations) of the screens with respect to the displays and within the application stacks 510, 520 may be arrived at by various methods including manipulation of screens via drag gestures, opening a new application on top of an existing screen rendered on a display, or other means of manipulation whereby screens are moved between the first display 102 and the second display 104.

In light of the foregoing, wherein applications may reside in application stacks associated with a display such that non-displayed applications remain in the application stack, it may be desirable or advantageous to allow for the manipulation of applications between displays such that applications may be moved from a first application stack to a second application stack by a user. The movement of applications between application stacks may, for instance, be accomplished by way of gesture inputs.

One embodiment of a handheld computing device functioning to move applications from one application stack to another application stack in response to a gesture input as shown in FIGS. 6A-6C. In FIG. 6A, application X 602 may be the actively displayed screen in a first display 102 and application A1 604 may be the actively displayed screen in a second display 104. Application B1 606 may be in a first application stack 610 associated with the first display 102 and positioned behind application X 602 when in the state shown in FIG. 6A. As such, application B1 may not be actively rendered on the first display 102 when positioned as shown in FIG. 6A. In FIG. 6A, a drag gesture 176 is received that corresponds to the first display 102 in a direction towards the second display 104. In response to the drag gesture 176, application X 602 may be moved from the first application stack 610 to a second application stack 620 associated with the second display 104 as shown in FIG. 6B. In this regard, application B1 606 which was previously disposed behind application X 602 in the first application stack 610 may become the actively displayed screen in the first display 102. Application X 602 may be moved to the second display 104 to become the actively displayed screen in the second display 104, and thus the top application in the second application stack 620. Application A1 604 which was previously the actively displayed screen in the second display 104 may be positioned behind application X 602 in the second application stack 620. As such, application X 602 is moved from the first display 102 to the second display 104 such that application X 602 goes from being logically associated with the first application stack 610 to the second application stack 620. As shown, application X 602 is given priority in the second application stack 620 such that application X 602 becomes the actively displayed screen once moved to the second display 104.

However, the movement of an application from a first display 102 to a second display 104 may not entail the movement of the application exclusively from a first application stack 610 to a second application stack. For instance, in FIG. 6B a subsequent drag gesture 176 may be received. The drag gesture 176 may be received such that it originates at the first display 102 and is directed towards the second display 104. Application B1 606 may comprise an expandable application capable of being displayed on multiple displays. As such, the drag gesture 176 may result in application B1 606 being expanded to occupy both the first display 102 and the second display 104. In this sense, application B1 606, once expanded, belongs to both the first application stack 610 as well as the second application stack 620 and becomes the actively displayed screen on both the first display 102 and the second display 104. As shown, application X 602 which was previously the actively displayed screen in the second display 104 is positioned in the second application stack 620 behind screen 606b.

Figure 7B:
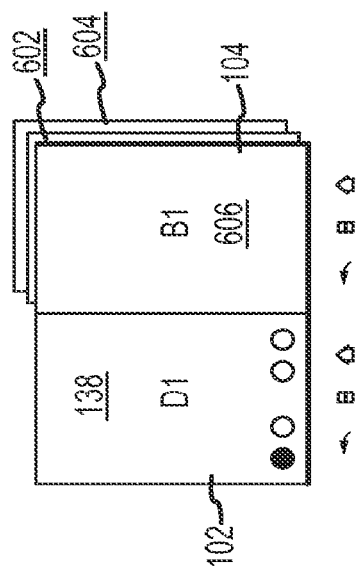
FIGS. 7A-7B are graphical representations of the embodiment of the handheld computing device shown in FIGS. 6A-6C functioning in response to a different gesture input.
Figure 7A:
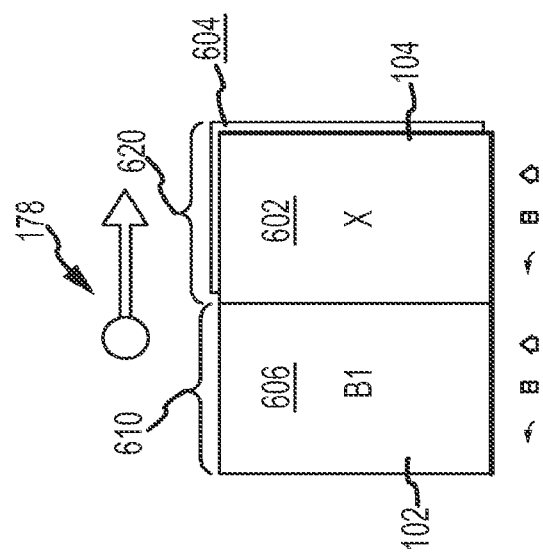
Figure 9A:
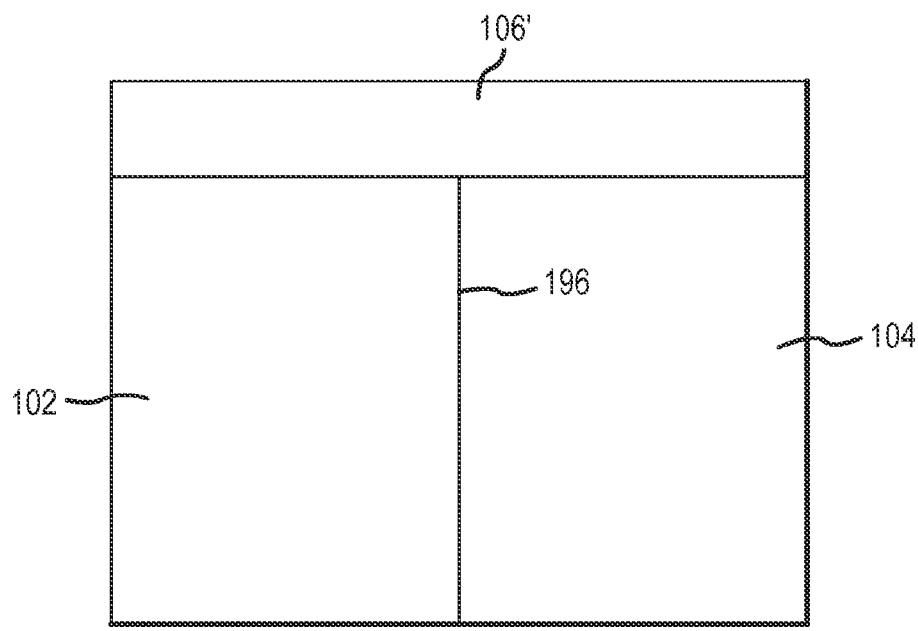
FIGS. 9A and 9B are schematic views of embodiments of a handheld computing device provided with touch sensitive devices.
Figure 9B:
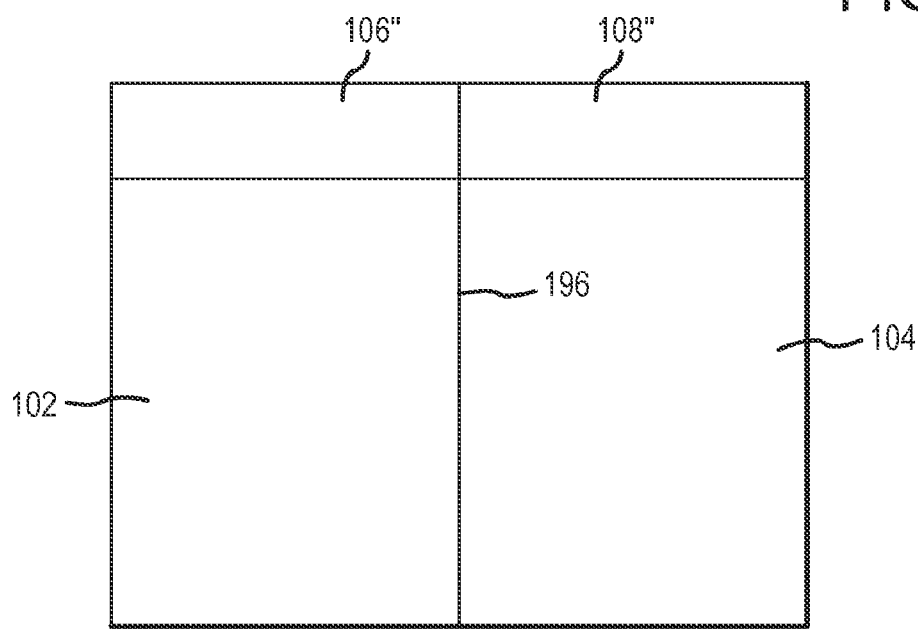

An alternative outcome of a receipt of a gesture input when a device is in a state shown in FIG. 6B is depicted in FIGS. 7A-7B. FIG. 7A shows the handheld computing device as was shown in FIG. 6B. However, unlike in FIG. 6B, in FIG. 7A a flick gesture 178 (in contrast to the drag gesture 176 received in FIG. 6B) is received at the first display 102 in a direction toward the second display 104. A flick gesture 178 may result in a different outcome than that associated with a drag gesture 176 such that the expandable application B1 606 is simply moved from the first display 102 to the second display 104 while maintaining the application B1 606 in single screen mode. As such, the result of the flick gesture 178 in FIG. 7A may be shown in FIG. 7B wherein application B1 606 has been moved from the first display 102 to the second display 104 such that the application B1 606 remains in single screen mode and becomes a part of the second application stack 620 exclusive of the first application stack 610. In turn, the previous actively displayed screen corresponding with application X 602 is moved to the second application stack 620 behind application B1 606. Application A1 604 is positioned behind application X 602 in the second application stack 620. Additionally, as application B1 606 was the last application in the first application stack 610, upon movement of application B1 606 into the second display 104, a desktop screen D1 138 may be displayed in the first display 102.

As discussed above, a gesture input may comprise multiple portions (e.g., in the case of a multi-touch sensor or other gesture sensor capable of receiving multiple gesture inputs simultaneously). In this regard, a first portion of a gesture input may be used to indicate that a corresponding screen of a display is to be maintained such that it is not moved in response to the receipt of a second portion of the gesture. For instance, a first portion of the gesture input may be received such that a corresponding actively displayed screen is maintained (e.g., pinned) as the actively displayed screen. In this regard, upon receipt of the second portion of the input gesture, an application other than the actively displayed screen may be the target of the second gesture such that the second portion of the gesture effectuates a movement of the application between application stacks behind the screen maintained as the actively displayed screen.

FIGS. 8A-8E depict another embodiment of a handheld computing device wherein applications are repositioned between application stacks based on a receipt of a multi portion gesture input. FIGS. 8A-8E generally show potential functionality related to movement of applications between application stacks. As such, alternative arrangements of the handheld computing device may be provided. For example, more or less applications may be provided that are manipulatable between the application stacks. Furthermore, the applications may be arranged with respect to the first and second displays. Also, the functionality described below may include directional movement (e.g., between the first display 102 and the second display 104). While the direction of the movement of an application may correspond with the direction of a received gesture input as described below, the movement may be in either direction between displays (e.g., from the first display to the second display or vice versa) without limitation.

In FIG. 8A, application B1 606 is an actively displayed screen of the first display 102. Additionally, application A1 604 and application X 602 may also be in a first application stack 610 associated with the first display 102. Display 104 may not have any applications disposed therein such that a desktop screen D2 138b is displayed in the second display 104 and no applications are part of a second application stack 620 associated with the second display 104. A pin and drag gesture 182 may be received such that a first portion 190 (i.e., a pin) of the pin and drag gesture is associated with the first display 102 and the second portion 192 (i.e., a drag) of the pin and drag gesture 182 comprises a directional gesture initiating at the first display 102 in a direction of the second display 104. The first portion 190 of the pin and drag gesture 182 may control the first display 102 such that the actively displayed screen in the first display 102 is maintained even when the drag portion 192 of the pin and drag gesture 182 is received. In this regard, the result is shown in FIG. 8B wherein application B1 606 is maintained as the actively displayed application in the first display 102 and application A1 604, which was the next application in the first application stack 610 is moved to the second application stack 620 from behind application B1 606. In this regard, application A1 604 was moved from behind application B1 606 as application B1 606 was pinned in the first display 102 by way of receipt of the pin portion 190 of the pin and drag gesture 182.

Additionally, when in the state shown in FIG. 8B, another pin and drag gesture 182 may be received. Again, the pin and drag gesture 182 may comprise a pin portion 190 associated with the first display 102 to maintain an actively displayed screen of the first display 102 even after receipt of the drag portion 192. In this regard, application B1 606 is again maintained as the actively displayed screen in the first display 102 and the application behind the actively displayed screen of the first display is the target of the drag portion 192 of the pin and drag gesture 182. The result is shown in FIG. 8C, wherein application X 602, which was previously behind application B1 606 in the first application stack, is the target of the drag portion 192 of the pin and drag gesture 182 received in FIG. 8B, and is moved to the second application stack 620. In FIG. 8C, another pin and drag gesture 182 may be received such that a pin portion 190 again pins the actively displayed screen of the first display 102. However, in FIG. 8C, there is no application residing behind the actively displayed screen. As such, upon receipt of the drag portion 192 of the pin and drag gesture 182, there is no application residing behind the actively displayed, pinned screen to be the target of the drag portion 192. In this case, the pin portion 190 of the pin and drag gesture 182 may override the drag portion 192 such that no movement takes place.

In addition to a gesture input comprising a pin portion and a drag portion wherein the drag portion moves an application from underneath the pinned application, a second pin and drag gesture 184 may be received such that the drag portion 192 is in a direction towards the pin portion 190. This may result in an application being moved to a position behind the pinned portion rather than from a position behind the pinned application as was shown in FIGS. 8A-8C.

This concept is demonstrated in FIG. 8D. In FIG. 8D, a second pin and drag gesture 184 is received. A pin portion 190 is received corresponding to a first display 102. As such, the actively displayed screen of the first display 102 is maintained as the actively displayed screen. The drag portion 192 initiates at the second display 104 in a direction towards the first display 102. In this regard, the actively displayed screen of the second display 104 is the target of the drag portion 192. As such, the actively displayed screen of the second display 104 is moved behind the pinned application in the first display 102. The result is shown in FIG. 8E wherein application X 602 which was the actively displayed screen in the second display 104 is moved behind the pinned screen of application B1 606. In this regard, application X 602 becomes a part of the first application stack 610. Also, application A1 604 which was residing behind the actively displayed screen of the second display 104 in FIG. 8D is revealed and becomes the actively displayed screen in the second display 104 as shown in FIG. 8E.

While the invention has been illustrated and described in detail in the drawings and foregoing description, such illustration and description is to be considered as exemplary and not restrictive in character. For example, certain embodiments described hereinabove may be combinable with other described embodiments and/or arranged in other ways (e.g., process elements may be performed in other sequences). Accordingly, it should be understood that only the preferred embodiment and variants thereof have been shown and described and that all changes and modifications that come within the spirit of the invention are desired to be protected.

What is claimed is:

1. A method for controlling a handheld computing device, comprising:
   providing a first screen and a second screen associated with the handheld computing device;
   logically associating one or more applications with the first screen of the handheld computing device;
   logically associating one or more applications with the second screen of the handheld computing device;
   establishing a first application stack corresponding to the one or more applications logically associated with the first screen, wherein the first application stack is a first logical representation of the one or more applications logically associated with the first screen, wherein the first logical representation is a data structure and comprises a relative order of the one or more applications logically associated with the first screen, and wherein one or more of the one or more applications logically associated with the first screen may not be displayed on the first screen;
   establishing a second application stack corresponding to the one or more applications logically associated with the second screen, wherein the second application stack is a second logical representation of the one or more applications logically associated with the second screen, wherein the second logical representation is a data structure and comprises a relative order of the one or more applications logically associated with the second screen, wherein one or more of the one or more applications logically associated with the second screen may not be displayed on the second screen;

receiving a gesture input at a gesture sensor of the handheld computing device, wherein the gesture sensor is not associated with the first screen or the second screen;

adding a first application belonging to the first application stack to a second application stack logically associated with a second screen in response to the receiving step such that the first application is logically associated with the second screen, wherein moving further includes expanding the first application to be the actively displayed screen of the first screen and the actively displayed screen of the second screen;

maintaining the relative order of the one or more applications of the first application stack such that the first application stays at a top position in the first application stack; and reordering the relative order of the one or more applications of the second application stack such that the moved first application is also at a top position in the second application stack.

2. The method according to claim 1, wherein the first application comprises an actively displayed screen of the first screen prior to the moving step and an actively displayed screen of the second screen after the moving step.

3. The method according to claim 2, wherein an underlying screen is revealed in the first screen after the moving step.

4. The method according to claim 3, wherein the underlying screen comprises one of a desktop screen and an application screen corresponding to a second application logically associated with the first screen such that the second application belongs to the first application stack.

5. The method according to claim 2, wherein the first application obscures a second screen in the second screen that comprises an actively displayed screen of the second screen prior to the moving step.

6. The method according to claim 5, wherein the second screen comprises one of a desktop screen and an application screen corresponding to a second application of a second application stack.

7. The method according to claim 1, wherein the gesture input comprises a first gesture portion and a second gesture portion.

8. The method according to claim 7, wherein the gesture input comprises a pin and drag gesture.

9. The method according to claim 7, wherein the first gesture portion maintains the actively displayed screen in a corresponding application stack, and wherein the second gesture portion results in movement of the first application relative to the actively displayed screen of a corresponding application stack.

10. The method according to claim 9, wherein the corresponding application stack is the first application stack, and the second gesture portion is directed away from the first gesture portion.

11. The method according to claim 9, wherein the first application is revealed in the second screen after the moving step.

12. The method according to claim 9, wherein the corresponding application stack is the second application stack, and the second gesture portion is directed toward the first gesture portion.

13. The method according to claim 12, wherein the first application is hidden in the second screen after the moving step.

14. A method of controlling a handheld computing device comprising:

providing a first screen and a second screen associated with the handheld computing device;

logically associating one or more applications with the first screen of the handheld computing device, the logical association being a first application stack data structure and comprising a relative order of the one or more applications, wherein one or more of the one or more applications logically associated with the first screen may not be screened on the first screen;

logically associating one or more applications with the second screen of the handheld computing device, the logical association being a second application stack data structure comprising a relative order of the one or more applications, wherein one or more of the one or more applications logically associated with the second screen may not be displayed on the second screen;

receiving a first portion of a gesture input, wherein the gesture input is received in a gesture capture region not associated with the first screen or the second screen;

targeting the first portion of the gesture input to a first screen having a first actively displayed screen corresponding to a first application;

maintaining the first actively screened screen in the first screen in response to the first portion of the gesture input;

receiving a second portion of the gesture input;

targeting a different screen than the actively displayed screen in the first screen with the second portion; and wherein the different screen undergoes a change in position with respect to the first screen and a second screen in response to the second portion of the gesture input;

moving a first application belonging to the first application stack data structure to the second application stack data structure logically associated with the second screen in response to at least one of the receiving steps such that the first application is logically associated with the second screen; and reordering the relative order of the one or more applications of the second application stack data structure such that the moved first application is at a top position in the second application stack data structure.

15. The method according to claim 14, wherein the first portion and the second portion of the gesture input are received at a gesture sensor associated with the first screen such that the different screen corresponds to a second application residing behind said first application.

16. The method according to claim 14, wherein the first portion of the gesture input is received at a gesture sensor associated with the first screen and the second portion of the gesture input is received at a gesture sensor associated with the second screen, wherein the different screen is moved from the second screen to the first screen behind the first screen.

17. The method according to claim 14, wherein the screens targeted in the corresponding steps at least partially depend upon a location where the corresponding portion of the gesture input is received.

18. A handheld computing device comprising:
a first display;
a second display;
a processor; and
a memory coupled with and readable by the processor and storing therein a set of instructions which, when executed by the processor, causes the processor to control application screens rendered on the first display and second display by:
logically associating one or more applications with the first display of the handheld computing device;
logically associating one or more applications with the second display of the handheld computing device;
establishing a first application stack corresponding to the one or more applications logically associated with the first display, wherein the first application stack is a first logical representation of the one or more applications logically associated with the first display, wherein the first logical representation is a data structure and comprises a relative order of the one or more applications logically associated with the first display, wherein a screen of one or more of the one or more applications logically associated with the first display may not be displayed on the first screen;
establishing a second application stack corresponding to the one or more applications logically associated with the second display, wherein the second application stack is a second logical representation of the one or more applications logically associated with the second display, wherein the second logical representation is a data structure and comprises a relative order of the one or more applications logically associated with the second display, wherein one or more of the one or more applications logically associated with the second display may not be displayed on the second display;
receiving a gesture input at a gesture sensor of the handheld computing device, wherein the gesture sensor is not associated with the first display or the second display;
adding a first application belonging to the first application stack to the second application stack in response to the receiving step such that the first application is logically associated with the second display, wherein moving further includes expanding the first application to be the actively displayed screen of the first display and the actively displayed screen of the second display;
maintaining the relative order of the one or more application of the first application stack such that the first application stays at a top position in the first application stack; and
reordering the relative order of the one or more applications of the second application stack such that the moved first application is also at a top position in the second application stack.

19. The handheld computing device according to claim 18, wherein the first application obscures a second screen in the second screen that comprises an actively displayed screen of the second screen prior to the moving step.

20. The handheld computing device according to claim 19, wherein the second screen comprises one of a desktop screen and an application screen corresponding to a second application of a second application stack.

* * * * *